United States Patent
Amacker

(10) Patent No.: US 9,824,376 B1
(45) Date of Patent: Nov. 21, 2017

(54) MAP BASED PAYMENT AUTHORIZATION

(75) Inventor: Matthew W. Amacker, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 358 days.

(21) Appl. No.: 13/197,616

(22) Filed: Aug. 3, 2011

(51) Int. Cl.
*G06Q 40/00* (2012.01)
*G06Q 30/06* (2012.01)

(52) U.S. Cl.
CPC ......... *G06Q 30/06* (2013.01); *G06Q 30/0601* (2013.01)

(58) Field of Classification Search
USPC ........ 705/44, 26, 37, 30, 39, 38, 26.41, 330; 235/379, 380, 449; 701/533; 726/7, 17; 713/189; 715/804; 455/411, 419; 707/10
See application file for complete search history.

(56) References Cited

U.S. PATENT DOCUMENTS

| | | | | |
|---|---|---|---|---|
| 6,947,976 B1* | 9/2005 | Devitt | ..................... | H04W 4/02 455/456.1 |
| 7,315,828 B1* | 1/2008 | McCarthy | ............. | G06Q 30/02 705/14.1 |
| 7,857,212 B1* | 12/2010 | Matthews | ............... | G06Q 10/02 235/380 |
| 8,127,982 B1* | 3/2012 | Casey | ..................... | G06Q 40/02 235/379 |
| 8,290,513 B2* | 10/2012 | Forstall | ............. | H04M 1/72544 455/414.3 |
| 8,774,825 B2* | 7/2014 | Forstall | .................. | G01C 21/20 455/456.1 |
| 2003/0018533 A1* | 1/2003 | Klein | .............................. | 705/20 |
| 2003/0018553 A1* | 1/2003 | Lindquist | ............... | G06Q 30/02 705/35 |
| 2003/0135463 A1* | 7/2003 | Brown | .................... | G06Q 20/04 705/44 |
| 2006/0131385 A1* | 6/2006 | Kim | ........................ | G06Q 20/24 235/379 |
| 2006/0253453 A1* | 11/2006 | Chmaytelli | ....... | G06F 17/30867 |
| 2007/0299742 A1* | 12/2007 | Williams | ............... | G06Q 20/02 705/39 |
| 2008/0004951 A1* | 1/2008 | Huang | .................... | G06Q 30/02 705/14.67 |
| 2008/0249938 A1* | 10/2008 | Drake-Stoker | ........ | G06Q 20/12 705/44 |
| 2008/0294556 A1* | 11/2008 | Anderson | .............. | G06Q 20/40 705/44 |

(Continued)

*Primary Examiner* — Tien Nguyen
(74) *Attorney, Agent, or Firm* — Hogan Lovells US LLP

(57) ABSTRACT

A map-based interface can be used to enable a user to provide another person with funds that can be used at a particular location. In at least some embodiments, a user can select one or more buildings, locations, establishments, or other such locations and indicate an amount of money that another person is authorized to spend at that location. The funds can be provided by the user using any appropriate mechanism, such as a credit card or back account. The recipient of the funds can use information in a portable device of the user to authenticate the recipient to an establishment, which can use the dual-key information of the recipient identity and establishment location to obtain authorization to utilize the designated funds as at least partial payment for a transaction of the recipient at that establishment.

23 Claims, 7 Drawing Sheets

(56) References Cited

U.S. PATENT DOCUMENTS

| | | | |
|---|---|---|---|
| 2009/0171842 A1* | 7/2009 | Blythe | G06Q 20/12 705/44 |
| 2009/0254463 A1* | 10/2009 | Tomchek | G06Q 20/12 705/30 |
| 2009/0327121 A1* | 12/2009 | Carroll | G06Q 20/10 705/39 |
| 2009/0327134 A1* | 12/2009 | Carlson | G06Q 20/04 705/44 |
| 2009/0327135 A1* | 12/2009 | Nguyen | G06Q 20/40 705/44 |
| 2011/0047039 A1* | 2/2011 | Crames et al. | 705/18 |
| 2011/0047075 A1* | 2/2011 | Fourez | G06Q 20/32 705/44 |
| 2011/0106698 A1* | 5/2011 | Isaacson et al. | 705/41 |
| 2011/0238476 A1* | 9/2011 | Carr | G06Q 30/00 705/14.25 |
| 2011/0238514 A1* | 9/2011 | Ramalingam | G06Q 20/10 705/21 |
| 2011/0238517 A1* | 9/2011 | Ramalingam et al. | 705/26.1 |
| 2011/0313874 A1* | 12/2011 | Hardie | H04W 4/02 705/26.1 |
| 2012/0084177 A1* | 4/2012 | Tanaka | G06Q 30/0613 705/26.41 |
| 2012/0209768 A1* | 8/2012 | Nuzzi | G06Q 40/02 705/44 |
| 2012/0278201 A1* | 11/2012 | Milne | G06Q 20/3224 705/26.41 |
| 2012/0284174 A1* | 11/2012 | Bentley | G06Q 30/02 705/39 |
| 2012/0330788 A1* | 12/2012 | Hanson et al. | 705/26.41 |

* cited by examiner

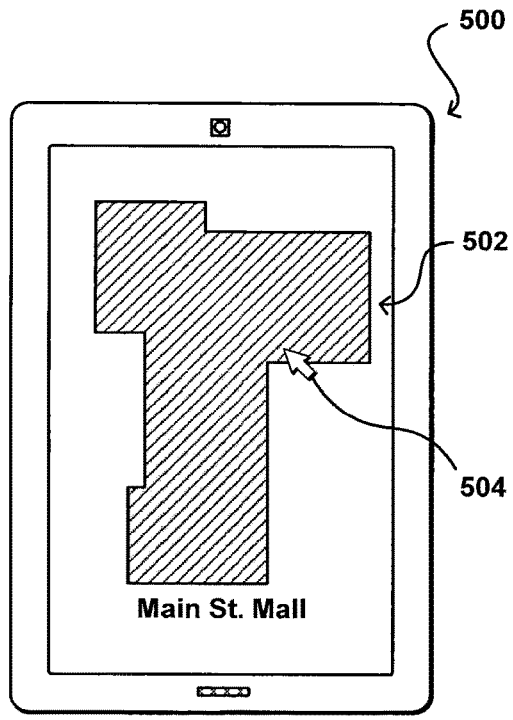
FIG. 5(a)
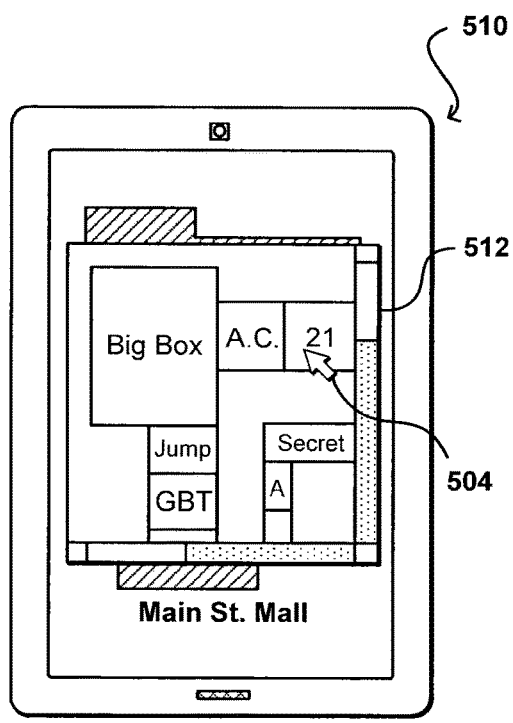
FIG. 5(b)
| Available credits | | | |
|---|---|---|---|
| Location | Amount | Sender | Limitations |
| Big Box store – any location | $20.00 | Mary | None |
| ACME books – San Diego | $13.28 | Mom | Books |
| Drug store – any | $50.00 | Mom | None |
| Restaurant – San Diego | $25.00 | Dad | No alcohol |
| Send thank you | Request More | Transfer | |
FIG. 6

MAP BASED PAYMENT AUTHORIZATION

BACKGROUND

As technologies such as near field communications (NFC) are increasingly supported by mobile and portable electronic devices, people are increasingly utilizing these technologies for various types of transactions. For example, a smart phone with an NFC chip can enable a user to provide a payment for a transaction wirelessly using information stored on the device, where that information typically is tied to a credit or bank account associated with the user. As users rely more heavily on these technologies, the users will rely less frequently on cash and gift cards, where stores even support gift cards. In situations where a person wants to give another person a specified amount of money for a particular purpose, such as for a birthday or as part of a child's allowance, there is currently no convenient way to utilize NFC and other such technologies to provide that amount, or at least to control how that money is spent. For example, a parent might not want to associate a credit card with a child's device, and transferring funds to an account associated with a child's device provides no control over how those funds are utilized.

BRIEF DESCRIPTION OF THE DRAWINGS

Various embodiments in accordance with the present disclosure will be described with reference to the drawings, in which:

FIGS. 5(a) and (b) illustrate example interface displays that can be presented to a user selecting an address or location corresponding to multiple entities in accordance with at least one embodiment;

FIG. 6 illustrates an example interface display enabling a user to see available designated funds in accordance with at least one embodiment;

DETAILED DESCRIPTION

Figure 1:
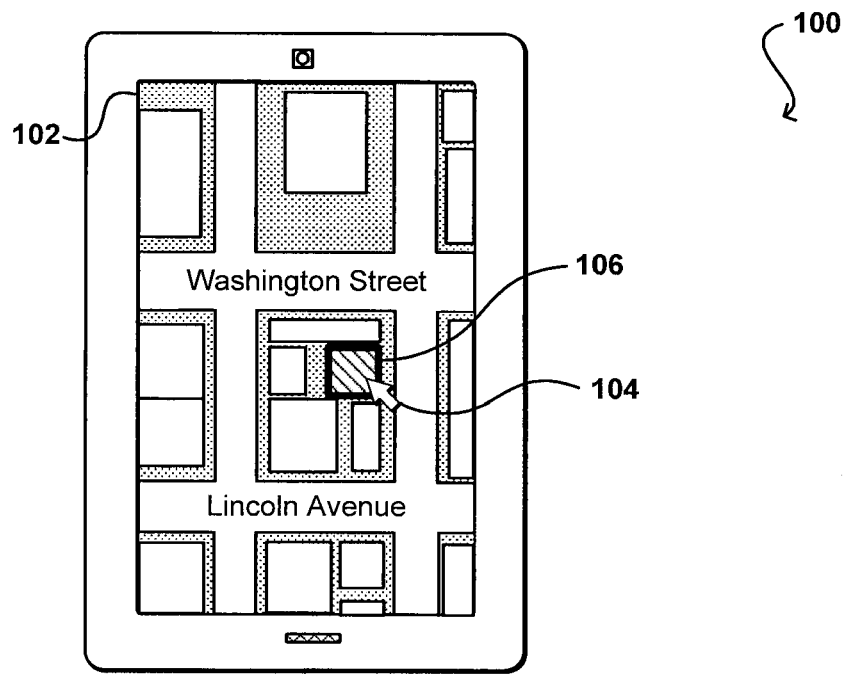
FIG. 1 illustrates an example interface display wherein a user is able to select a location displayed on a map in accordance with various embodiments.

Systems and methods in accordance with various embodiments of the present disclosure may overcome one or more of the aforementioned and other deficiencies experienced in conventional approaches to transferring funds and/or authorizing access to funds for any of a variety of purposes. In particular, various embodiments enable a user to provide payment for a transaction using an electronic device, where that electronic device includes identifying information that has been associated with a source of funding. The identifying information can be associated with that source of funding by another person or entity, such as a person providing a gift, allowance, or payment to a particular user. In addition to enabling a user to utilize those funds for a transaction using an appropriate electronic device, the persons causing the funds to be transferred can also have at least some control over where and/or how those funds are used.

In at least some embodiments, a person wanting to transfer funds to an intended recipient is able to access a map-based interface enabling that person to select one or more locations on the map. The location may correspond to, for example, an address, a building, a set perimeter, a type of business, and the like. The person can specify an amount to be transferred to an account associated with a particular recipient, for example, and indicate that the funds are only to be used at the selected location(s). In some embodiments other limitations can be specified as well, such as chains or types of stores, stores within a certain geographical area, stores selling certain types of goods, etc. In some embodiments, the person also can specify other attributes, such as types of items that cannot be purchased using the funds. Such an approach enables a gift card-like approach to be utilized for transactions at locations that might not otherwise support gift cards, but are able to accept funds via the recipient's electronic device.

In some embodiments, a person might be able to authorize funds to be transferred to a recipient via the map-based interface, where those funds are to come from an account (e.g., bank or credit) associated with the sender. In other embodiments, a one-time or limited credit account can be opened for the amount designated by the sender, which then can be associated with the intended recipient. When the recipient exhausts the funds in that temporary account, the account number can be recycled and no longer available to the user. Various other funding approaches can be used as well within the scope of the various embodiments.

In addition, various embodiments provide notifications to the sender and/or recipient when the funds are used. For example, the recipient when spending the funds could receive a message indicating the person from whom those funds were received. In some embodiments, the recipient can then have the ability to send a thank you note or other such message to the sender. In some embodiments, a notification can also be sent to the sender, such that the sender can know that the funds were used and, in some cases, can also learn what the recipient purchased with the funds.

Various other applications, functions, and advantages are presented below with respect to the various embodiments. It should be understood that the description and figures provide a number of examples, but the alternatives and variations possible within the scope of the various embodiments are not fully described. There alternatives and variations, however, would be apparent to one of ordinary skill in the art in light of the teachings and suggestions contained herein.

FIG. 1 illustrates a first example state 100 of a computing device displaying a map-based interface on a display element 102 in accordance with one embodiment. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, desktop computers, notebook computers, personal data assistants, cellular phones, video gaming consoles or controllers, and portable media players, among others. In this example, a user of the device has accessed the map-based interface using any appropriate approach, such as by opening a map-generating Web page through an Internet browser or opening a payment authorization application on the computing device.

In the example of FIG. 1, the user has selected a particular location corresponding to a building 106 represented on the map, such as by moving a cursor 104 to a location at or near the location, pressing the user's finger on a particular location, or using another such selection approach. It should be understood, however, that the user can utilize another approach to provide information based at least in part upon the map display, such as by entering an address into a text box, selecting a type of store from a list or stores in a given area, etc. In at least some embodiments, an application executing on the device (or on a remote system) can attempt to determine information corresponding to the input location, as may include a type of entity at that location, a boundary or perimeter of a property at or near that location, an address near that location, and/or other such information. In this example, where the user is intending to authorize a payment or otherwise transfer funds to another user based at least in part upon the input location, the application can attempt to determine at least one store, restaurant, market, or other such entity corresponding to that location at which the user might want to authorize funds for a transaction.

Figure 2:
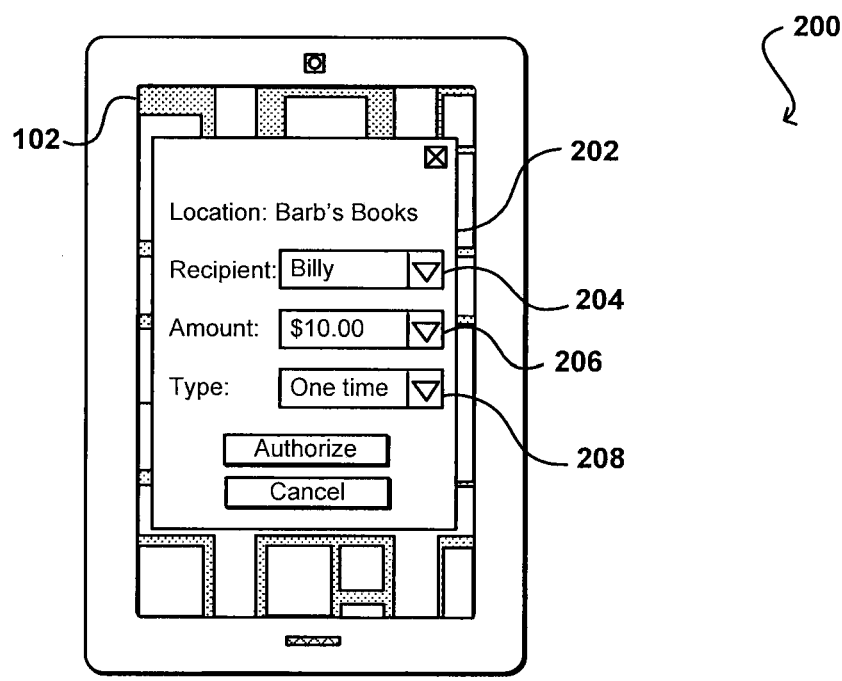
FIG. 2 illustrates an example interface display wherein a user has selected a location on the map and the user then is able to specify an amount of money to be available to another user at that location in accordance with various embodiments.

For example, FIG. 2 illustrates another example state 200 of the computing device, wherein the selection of a particular building by a user triggered an interface element 202, such as a popup or modal window, that enables the user to enter or select information about that location. In this example, the mapping/authorization application has determined that the user selected a location that most likely corresponds to a store called "Barb's books." Any of a number of consensus or determination algorithms can be used to determine an appropriate establishment based on the input location in accordance with the various embodiments. In instances where a consensus cannot be reached (with at least a minimum level of certainty) as to which entity matches the location, a list of possible matches might be presented to the user to enable the user to specify the intended entity. Various other approaches to clarifying the intended entity or establishment can be utilized as well as should be apparent in light of the present disclosure.

In FIG. 2, the user can specify any of a number of different types of information to be used to authorize the transaction. In this example the user has specified a particular recipient 204 of the funds, as well as an amount 206 to be authorized for that recipient. In some embodiments the user might be able to authorize up to a limited amount of funds, or up to an amount available from a particular source, such as a user account. The user has also specified the type of authorization 208, in this case a one-time authorization. There can be various other types of authorizations in accordance with the various embodiments as well, such as weekly, monthly, or other periodic or recurring authorizations. In some embodiments, the authorization might occur upon each instance of the user entering a location or type of establishment, up to a certain limit in at least some embodiments. For example, a parent might authorize a child to be able to spend up to $10 each time the child enters a book store, or $5 each time the user enters a school cafeteria. In some embodiments the user might specify this as a daily limit, or might put a limit on the authorization such as up to $20 a day, even though each individual occurrence might only have a $10 authorization. Such an approach can enable a parent to ensure a child has money for breakfast, lunch, and dinner, if needed, but cannot splurge beyond a reasonable amount at any given sitting.

The user can also specify various other criteria in accordance with various embodiments. For example, the user can specify a source of the funds, such as a credit card or bank account of the user. The user can also specify how the funds are to be delivered, such as whether the recipient can utilize the user's credit card number up to the authorized amount at the time of purchase, whether a temporary account is to be created, whether the funds are to be transferred into a controlled account for the recipient, etc. Also, it should be understood that, while drop-down boxes are shown, the interface can include any appropriate user-accessible element to enable the user to provide or specify the necessary information.

Figure 3:
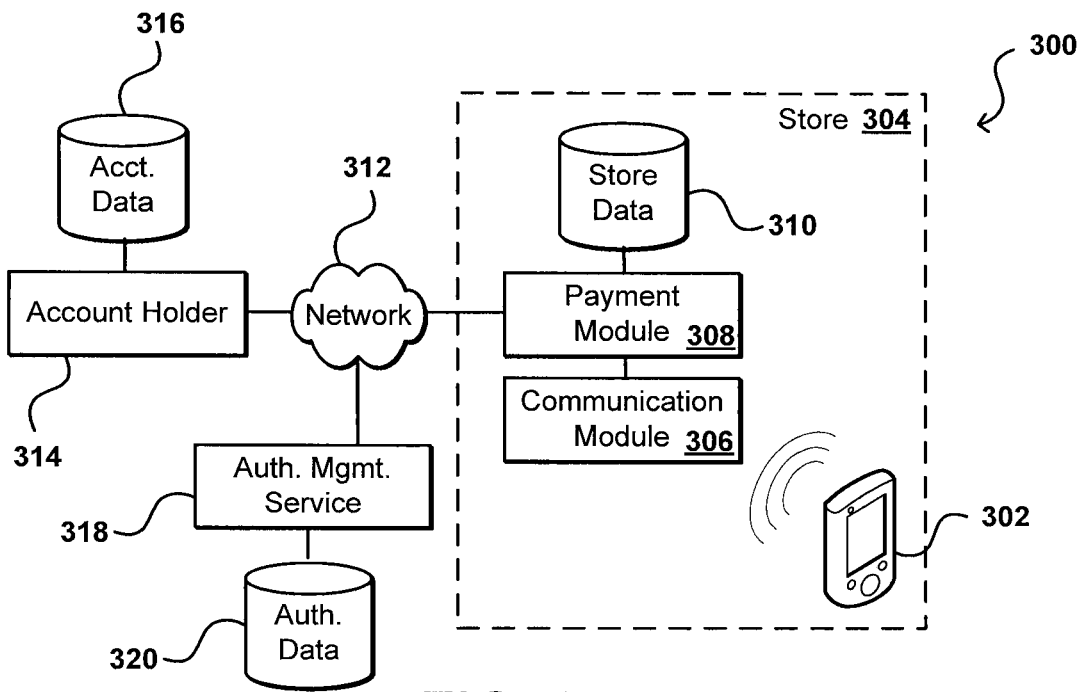
FIG. 3 illustrates an example environment in which a computing device can utilize funds for a transaction at a designated location that can be used in accordance with various embodiments.

FIG. 3 illustrates an example of an environment 300 in which the transferred and/or authorized funds can be accessed by a recipient in accordance with various embodiments. In this example, the recipient accesses an electronic device 302 associated with the recipient to attempt to pay for at least part of a transaction with a particular entity, in this case a store 304 in which the recipient is currently located. The electronic device 302 in this example includes an appropriate payment and/or authentication technology, such as a near field communications (NFC) chip enabling identifying information to be provided to authorize access to various types of funding. The store also has at least one communication module 306 operable to communicate with the electronic device, such as through an NFC-related communications channel, to enable the information to be obtained to allow the store to obtain payment via the information on the electronic device. Often, the electronic device will be brought to within a specific range of an NFC detection device, such as by tapping the electronic device against the NFC detection device, in order to ensure that the NFC detection device does not accidentally detect and charge the transaction to another nearby device. In at least some embodiments, there will be identifying information transferred to a payment module 308 of the store, which can communicate over at least one appropriate network (e.g., a cellular network or the Internet) to communicate with an entity such as an account holder 314 (e.g., a bank or credit card company). The identifying information obtained from the device, as well as address or location information for the store, etc., can be compared against the information stored in an account data store 316 for the account holder 314 to determine whether the funds are available for that particular user and/or device at that particular location.

In some embodiments, the account holder 314 can also manage the information provided by the sender of the funds, as may include an allowed location or type of business, an authorized amount, etc. In other embodiments, a third party provider such as an authorization management service 318 can provide information that can be used to authorize the providing of funds for the transaction. For example, authorization information such as that entered with respect to the example of FIG. 2 can be collected by the authorization management service 318 and stored to an appropriate authorization data store 320. When the user attempts to pay for at least part of a transaction using the portable computing device 302, the identifying information from the device can be combined with geo-location data or other such information for the store and sent over the one or more networks 312 to the authorization management service 318.

The authorization management service 318 can compare the identity and location information to authorization information stored in the authorization data store 320. If there is a match, the authorization management service can provide an authorization to the payment module 308 for the store 304 and/or the account holder 314, enabling the payment module and account holder to transfer funds for the transaction over an appropriate secure channel or other such mechanism. In at least some embodiments, the authorization service can provide other information as well, such as an amount of the authorization, whether there are multiple authorizations that can be combined, a source of the authorization, an allowed or prohibited type of transaction, and/or other such information. This information can be used to assist the payment module 308 or another such element of the store 304 to determine whether, and to what extent, funds can be utilized for the desired transaction. In at least some embodiments, the store 304 will verify that the funds can be applied to at least a portion of the transaction before contacting the account holder 314. In at least some embodiments, the account holder will obtain the authorization information from the authorization management service 314 and transaction data from the payment module 308 and make a separate verification before enabling the funds to be accessed and/or transferred for the pending transaction. Various other approaches can be used as well within the scope of the various embodiments.

Once the use of specific funds is authorized, the transaction can be completed using any appropriate technique known or used in the art for causing electronic payment to be made for one or more items (including products, virtual objects, and/or services) once a source of funding is identified. As should be apparent, there can be multiple sources of funding used for a transaction, such as where the user has a $10 authorization from a particular temporary account but spends over that amount, whereby the remainder can be deducted from a different account, paid for with cash, etc. In at least some embodiments, the device will prompt the user to approve the sources of funding to be used. For example, a user might have two virtual gift cards available and only want to use one for the current transaction. Similarly, a user might be purchasing an item that the user does not want the sender of a virtual gift card to know the user purchased, or at least purchased with a virtual gift card. Further, a user might want to know how much is being charged to a separate account for which the user is responsible.

Figures 4A, 4B:
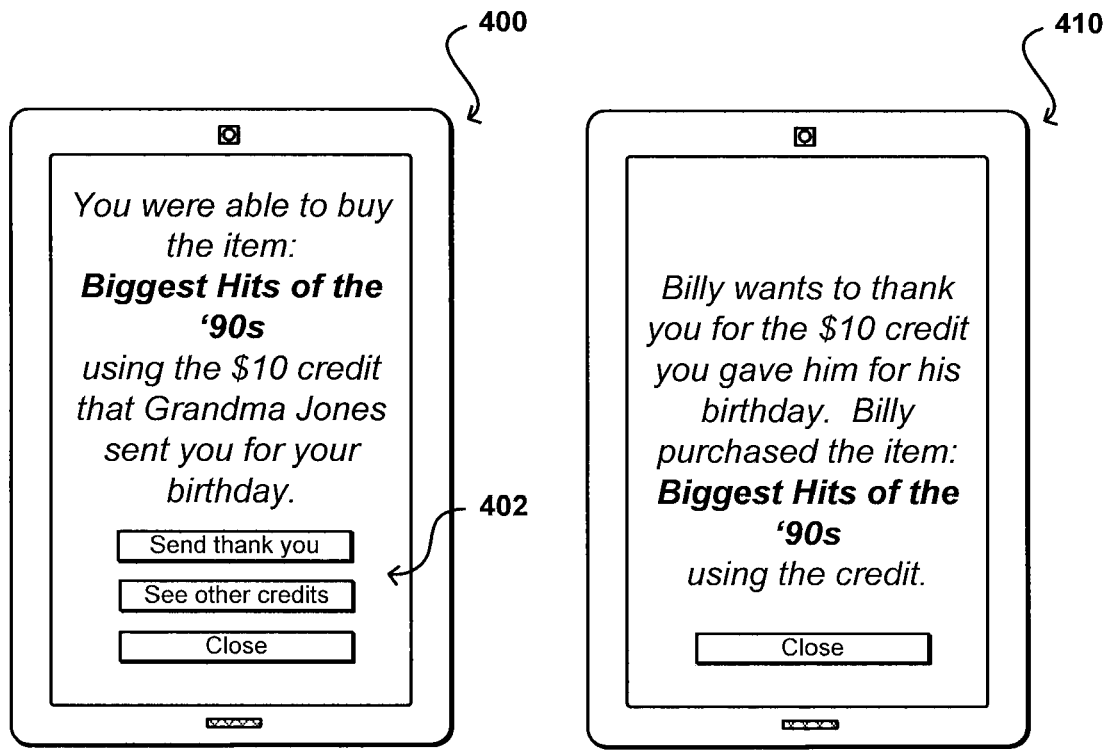
FIGS. 4(a) and (b) illustrate example interface displays that can be presented to different users upon use of designated funds in accordance with at least one embodiment.

There can also be various other types of notifications provided in response to the transaction. For example, FIG. 4(a) illustrates an example display on a computing device 400 of a recipient of a source of funds who used those funds to purchase an item as part of a transaction. In this example, the notification indicates to the user who provided the funds that were used to purchase one or more items in the transaction. In some embodiments, a transaction with multiple items can cause the user to be prompted to specify the item(s) to which the funds are to be applied. In this example, the user can see that the credit or funds used to purchase an item were provided by that user's grandmother. This can be a reminder of the provider of the funds or credit, or can in some instances be an initial notification of the sender of those funds. In at least some embodiments, the user can also be provided with one or more options 402 to perform specific functions in response to the notification. For example, the recipient can send a thank you note to the sender, which can be automatically generated and/or personalized by the recipient. A recipient can also select an option to view other credits for that location, nearby locations, all other available credits, etc. In some embodiments, this notification can include an animation, audio file playback, and/or personal note selected by the sender, such as to wish the recipient a happy birthday.

FIG. 4(b) illustrates an example display on a computing device 410 of the sender of the funds or credit that was used, by the recipient, to purchase an item. In this example, the sender can receive a notification indicating that the funds provided to the recipient were used. In this example, the notification also indicates the item for which the recipient used the funds. In some embodiments, a picture of the item can be included, where available and/or taken by the recipient. As mentioned, in some embodiments the recipient can customize the message or at least select a type of notification to be generated. In at least some embodiments, the sender can cause information for the item to be stored for future reference, such as where the sender wants to keep track of the interests of the recipient for future purchases, topics of conversation, etc. Although a pop-up style notification is displayed, it should be understood that a notification can take any appropriate form, such as an email message, instant message, text message, item on a Web page, etc.

As mentioned, such a map-based approach can enable a sender to provide funds or credit to a recipient that can be tied to a specific store, address, region, or other such location or area. In the example of FIG. 1, the sender selected a specific building from the map in order to authorize the spending of funds by the recipient at a retailer housed in that building. In many instances, however, a selected location might not correspond to a single specific store or entity. For example, the location might be an indoor flea market that can include multiple vendors that can change on any given day. In such a situation, a map-based authorization application or service might tie the authorization to within the boundary of the building. If the flea market can also include outside vendors, the authorization might be tied to the boundary of the property on which the flea market is held. The type of authorization can be based upon information stored for that location, entered by the user, or obtained from a third party source. If the authorization is for an arts and crafts festival in a town center, the authorization might be for a distance from a given center point, within a boundary of the town, or using any other appropriate location designation.

In some instances there might be multiple providers associated with a location but the sender only wants to authorize the funds to be used with one or more specific providers at that location. For example, FIG. 5(a) illustrates an example situation 500 wherein a user has selected, using the user's finger 504, a cursor, or other appropriate selection mechanism, a location 502 corresponding to a mall or shopping center. The mall contains several different stores, and the sender might only intend for the funds to be used at certain locations, such as clothing stores or book stores. In at least some embodiments, selecting such a location can cause a separate map 512, sub-map, listing, or other such display to be provided as illustrated in the example 510 of FIG. 5(b). This map can be provided from any appropriate source, such as a source associated with the mall or a third party entity. In this example, the user can select at least one of the stores contained within the mall from the mall-specific map 512, such as by clicking on or pressing an area associated with each intended store. In some embodiments, a user can alternatively select stores where the user does not want the funds to be authorized. For example, the recipient might be authorized to use the funds at any store or location in the mall other than the stores selected by the sender, such as a bar or smoke shop. A similar approach could be used for the recipient's home town or college, where the sender authorizes funds to be spent within a certain region except at certain stores or locations.

As mentioned, a sender in at least some embodiments can authorize (or not authorize) funds to be used at specific types of locations and/or for certain types of goods and services. For example, a sender might select a book store in town but then authorize the recipient to also spend the funds at any other bookstore in town, or for a book independent of the seller of that book within the town. Similarly, a parent might give a student an allowance to be spent on campus but specify that the funds are not to be used at a bar or for alcohol at any location. Various other combinations and approaches can be used as well within the scope of the various embodiments.

In at least some embodiments, a recipient can pull up a list of the pending authorizations that the recipient has not yet used, as well as potentially past authorizations as well. For example, FIG. 6 illustrates an example display 600 showing available credits for a user. The display can provide any appropriate information, such as the location at which the funds are authorized, the amount authorized (or remainder of funds under the authorization), and a sender or source of the funds. The display in this example also includes any limitations on the use of the funds, such as to be used only for books or to be used for anything but alcohol at a particular establishment. As illustrated, the types of location can vary from any location of a retail chain to locations of a chain within an area, any location of a type of store, and any other appropriate location type discussed or suggested elsewhere herein. Such an interface can provide various options 602 to the user as well. For example, the user can select an option to send a thank you message for one of the authorizations, such as where a new authorization is received. The user can also potentially select an option to request more funds, such as where a parent provides an amount of funding for school-related expenses to the recipient. The user can also select options to perform various other types of functions, such as to transfer the credit to another person, reject the authorization, request a change in the limitations, etc.

Figure 7:
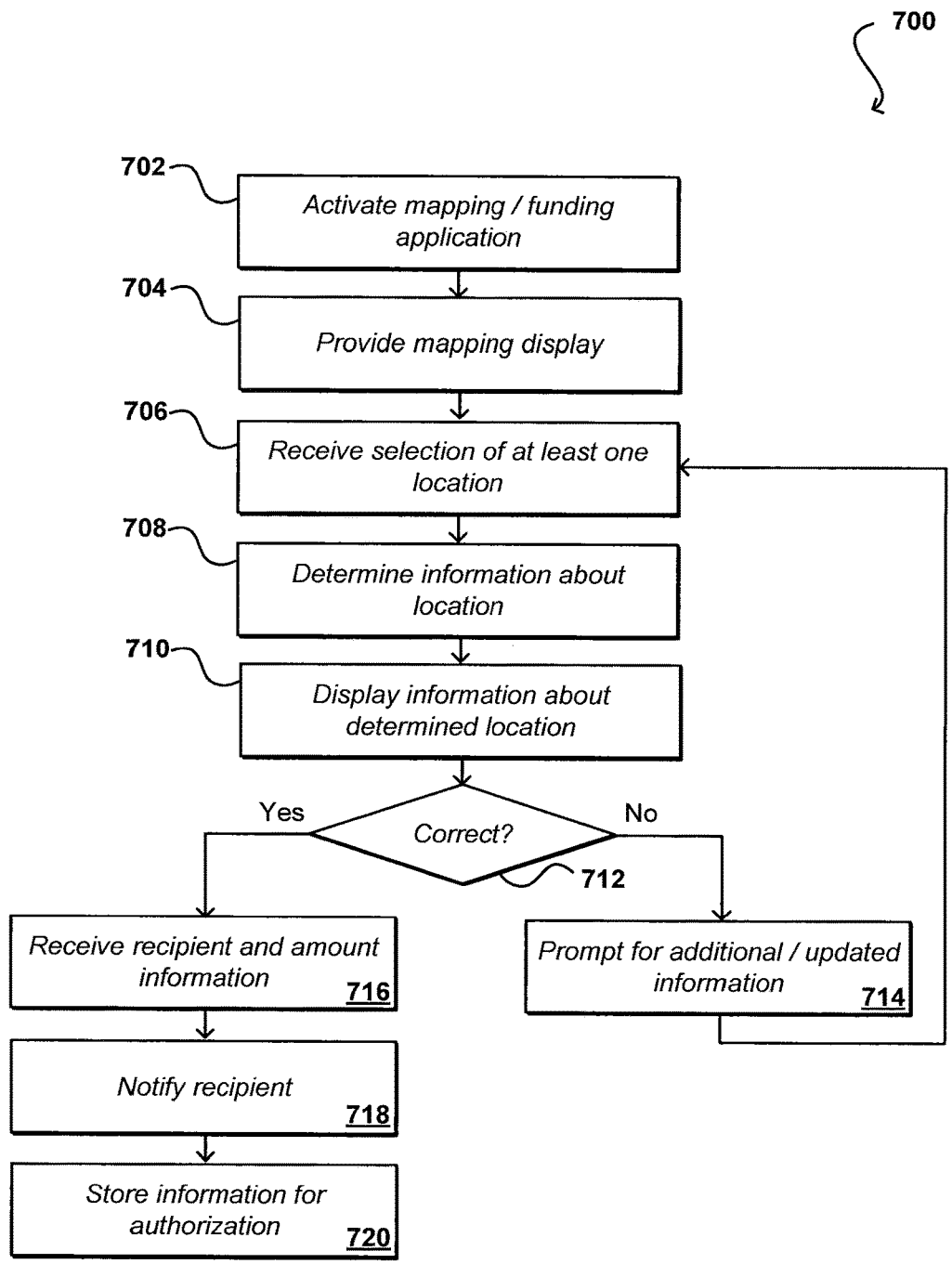
FIG. 7 illustrates an example process for authorizing payment that can be used in accordance with various embodiments.

FIG. 7 illustrates an example process 700 for authorizing a payment, credit, or transfer of funds that can be used in accordance with various embodiments. It should be understood that there can be additional, fewer, or alternative steps performed in similar or alternative orders, or in parallel, within the scope of the various embodiments. In this example, a mapping and/or funding application is activated 702, such as by the user selecting an icon associated with the application or accessing a Web page associated with the application. As discussed, the application can be a dedicated map-based authorization application, or the payment authorization may be offered as a plug-in or otherwise work with one or more separate mapping applications. A mapping interface is provided for display to the user 704, such that the user can navigate to, or otherwise locate, one or more locations of interest. Various approaches to locating one or more locations via a mapping interface are known in the art and as such will not be discussed herein in detail.

A selection of at least one location displayed via the mapping application is received from the user 706, such as by a user clicking on a displayed building or selecting an address or region, etc. The application, or a system or service in communication with the application, can attempt to determine information about the location, such as a type of the location, a store or vendor located at that location, a number of retail establishments at that location, and other types of information discussed or suggested elsewhere herein. At least some of this information can be displayed to the user 710, which can enable the user to confirm that the user selection was properly interpreted to include the desired location(s) for the authorization. If the user indicates that the information is not correct 712, or at least not what the user intended, the user can be prompted to provide additional information and/or update the selected location 714, etc. Using the additional and/or updated information, the application can again attempt to determine the appropriate information for that location. Once the correct location is determined, the user can provide information for the intended recipient, the amount of the authorization, any limitations or other stipulations, and other such information 716, although this information could be received before or with the location in other embodiments. The application can make any necessary authentications or verifications to ensure that sender is authorized to provide the authorized amount and the intended recipient is able to receive the authorized amount. As discussed elsewhere herein, this can involve a direct transfer of funds, generation of a temporary account, a limited authorization against an existing account, etc.

As mentioned, in at least some embodiments a notification can be generated for the recipient 718 indicating that the recipient has a new funding authorization. In some embodiments, this may reflect funds added to an existing authorization, while in other embodiments this can reflect a new authorization from a new or existing source. The notification in some embodiments will provide at least the location of the authorization, and can also include information such as the identity of the sender, any limitations on the usage of the funds, etc. Information for the authorization, such as recipient identity information and authorization location information can be stored 720 for subsequent authorization. Various other aspects can be utilized as well within the scope of the various embodiments.

As discussed, a notification can be provided in various ways and at various times, to convey varying levels of information. For example, a notification might be provided to a recipient as soon as a new authorization is available, where the notification might include an identity of the sender, an amount of available funds, one or more locations where the funds may be spent, and other such information. In other embodiments, a notification might be sent indicating that the recipient has a new authorization at a certain location, but the identity or the sender and/or amount might not be provided until the recipient arrives at that location or attempts to utilize the funds as part of a transaction. In some embodiments, a recipient might only be notified of an authorization when the recipient reaches a certain location, such as a store, school, or other location where the funds are authorized. Various other approaches can be utilized as well, as discussed and suggested elsewhere herein.

In at least some embodiments the notification and/or authorization might be contingent upon the recipient performing a specific action, such as to go to one or more specific locations. For example, a recipient having potentially available funds might carry a portable device with that recipient, enabling the user's location to be tracked over time. Using such information, an authorization or notification might be provided only upon the recipient visiting a certain location. For example, a recipient might only have funds authorized as part of a birthday gift if that recipient first visits his or her grandmother. In some cases, the recipient might receive the notification but the funds are not actually authorized until the recipient is determined to be at the grandmother's location. Alternatively, the authorization might be provided but the recipient might not be notified of the authorization until the recipient visits the grandmother's house.

Similar approaches could be used in other embodiments to enable incremental payments to be made to a recipient based upon meeting certain criteria. For example, a courier might not receive payment authorization until all routes for a given day are determined to be completed, or might receive partial payment for each route as that route is completed. Similarly, government contractors or other such employees or contractors might have authorizations made upon satisfaction of various criteria. For example, position of a contractor can be tracked over time, and payment authorized or declined based upon where the contractor goes over a certain period of time. In some embodiments, funds can be tied to a specific geographical area such that a city government employee is only authorized to spend city funds at businesses or locations within the city limits. Similarly, the authorization can be tied to specific businesses, which can enable contracts to be made with specific stores or chains that can result in discounts or other such savings. Locations at which funds are spent then can be tracked for various purposes, such as auditing, performance evaluation, etc. In some embodiments, a pizza deliver person might receive authorized funds for making deliveries within the allotted amount of time. Various other incremental and/or contingent payments can be authorized as well within the scope of the various embodiments.

Figure 8:
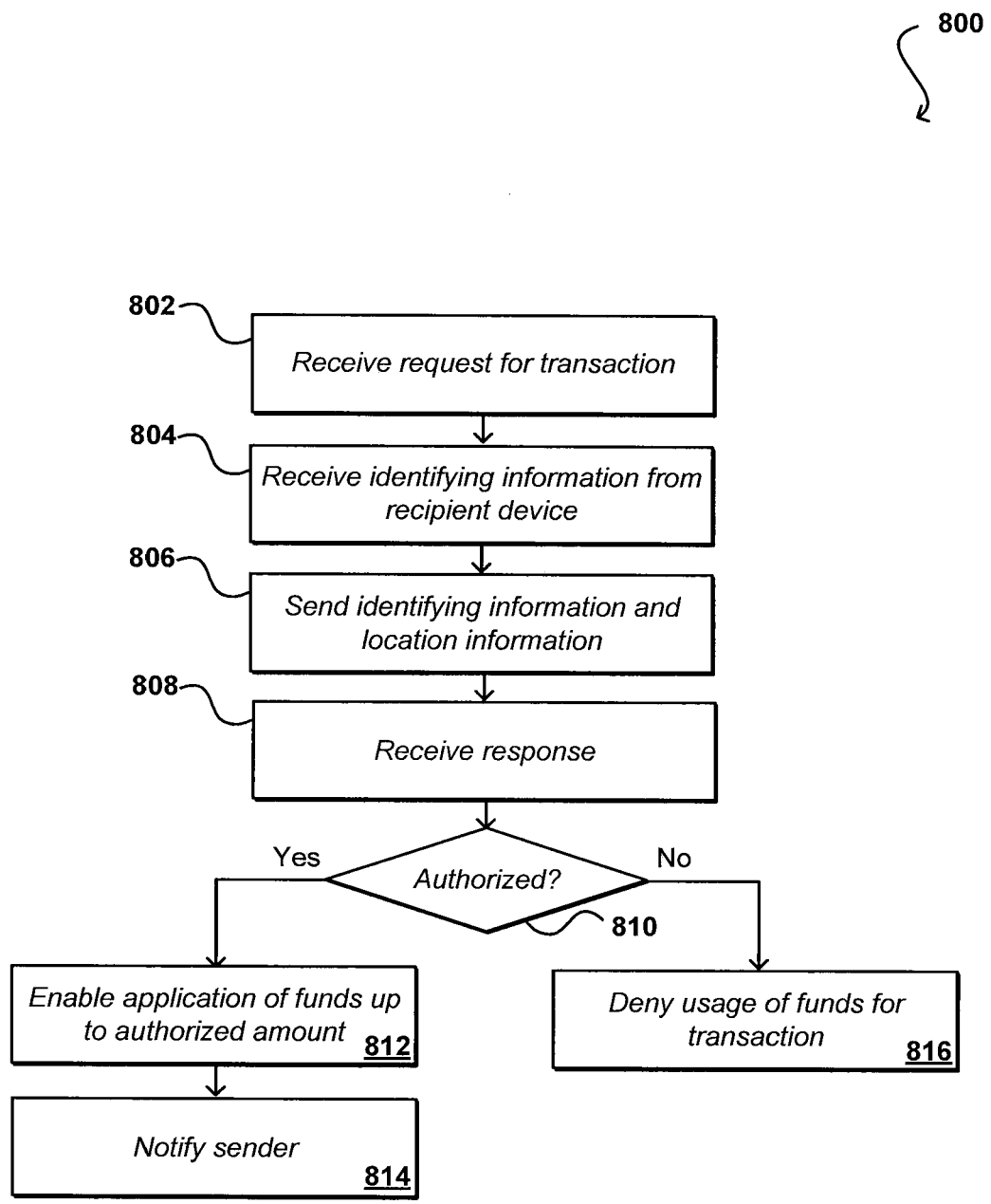
FIG. 8 illustrates an example process for utilizing an authorized payment that can be used in accordance with various embodiments.

FIG. 8 illustrates an example process 800 for utilizing authorized funds as payment for at least part of a transaction in accordance with at least one embodiment. In this example, a request for a transaction is received 802, such as by a person scanning one or more items into a register or computing system. Identifying information can also be received for the transaction from a recipient device 804, such as by the recipient of the funds tapping an NFC-capable device against an NFC terminal of the retailer. A computing system for the retailer can send a request to an appropriate entity, such as a payment authorization management service, to obtain confirmation that the usage of funds for the transaction is authorized, where the request includes at least the identifying information obtained from the recipient device and location information (e.g., geo-location data or address information) for the location of the retailer 806. As discussed elsewhere herein, the transmitted information can also include a requested amount, information about items in the transaction, facial capture data of the recipient initiating the transaction, and the like. After the appropriate entity processes the data, a response will be received 808 indicating whether the recipient is authorized to utilize one or more sources of funding for part of the transaction. In particular, the response can indicate whether at least one designated source of funding (e.g., a temporary account, funds transfer, etc.) is able to be used for the transaction based at least in part upon the terms of the authorization, the identity of the recipient, and the location of the transaction. If at least one funding source is authorized 810, the application of funds can be enabled to be used for the transaction up to the authorized amount 812. In at least some embodiments, a notification can also be sent to the sender or source of those funds 814. Any remainder of the cost of the transaction beyond the authorized amount then can be made up using one or more other sources of funding. If the use of the funds is not authorized, the usage of those funds can be denied for the transaction 816.

As discussed, such an approach can enable a sender to provide a virtual gift card to a recipient for a location that may or may not otherwise support gift cards. Similarly, such an approach can enable a sender to give a recipient money while maintaining some control over where and how that money is spent. In at least some embodiments, a log can be maintained indicating usage of various authorized funds, which then can be analyzed at any time to determine how those funds are being utilized over time.

As another advantage, the virtual gift card can be accessed utilizing the recipient's phone or portable computing device, and thus is more likely to be with the recipient when the recipient is at the location of the authorization than a gift card, which the recipient might not carry around and might even lose, misplace, or forget about. In at least some embodiments, a notification can be generated for a recipient when the recipient has an authorization for a nearby location. For example, if the recipient enters a store and the recipient has an authorized amount for that store, the recipient's device might vibrate or emit an audible tone indicating to the recipient that there are funds available. Similarly, the authorizations can be aggregated to enable the recipient to quickly determine how much money the recipient has authorized for that location. In some embodiments, a recipient might be at a location that is not necessarily designated as an authorized location, but might attempt to purchase a type of item that has an authorization, and the recipient could be automatically notified of the authorization and asked whether the recipient would like to utilize those funds for the determined item. Various other approaches are possible as well within the scope of the various embodiments.

In some embodiments, the location at which the funds are authorized can be more than an address, perimeter, or other such designation. For example, a parent might want to make sure that a child uses the funds for food at a restaurant instead of paying a friend for concert tickets while the child is within the bounds of the restaurant. Thus, the location can also include information such as a retailer identity or other such identifier, as well as or in place of geo-location or other such data. If a business is identified as part of the authorization, for example, then the transaction may have to involve that business in a determinable way. Alternatively, the sender might not care how the funds are used in an area and simply might authorize usage of the funds within a boundary, such as the perimeter of the state fairgrounds.

In some embodiments, the authorization management entity, or a related entity, might provide the limited accounts for the authorizations. For example, a sender might submit an authorization to the management entity, which could obtain payment from the sender for the authorization. The management entity could then issue a temporary account number to the recipient corresponding to the stored funds. When the recipient attempts to utilize the authorized amount, the funds for the temporary account number then will come under direction of the management entity. And as discussed, access to the account can be tied to the dual-key pair of the device authentication and the location of the transaction, etc.

In some embodiments, the sender can partition how the authorized amount is to be spent. For example, a child might get $500 a month to spend within the perimeter of a college, but might have allocations such as up to $200 month for food, up to $50 for supplies, $50 for entertainment, etc. Or the parent might instead specify that there is a $50 limit on entertainment, and any other usage within the college perimeter is enabled. In other embodiments, the parent might allocate $200 to the cafeteria on campus, $100 to the book store, etc. Various ways of distributing or sub-allocating the funds can be used as well within the scope of the various embodiments.

In some embodiments, a recipient can have an authorized amount pushed to that user's device when the user enters a store, mall, or other such location. This could be, for example, a $5 gift card that can be used by the user as long as the user is within the designated location, engaging in a transaction with a particular retailer, etc. In at least some embodiments this temporary account can have a limited lifetime, such that if the user does not make a purchase that day the temporary account expires, etc.

In some embodiments, a user accessing a mapping application can see locations at which the user has funds allocated. For example, a user might be walking downtown looking for something to eat. The user could potentially access a map on the user's phone that would indicate on a map (or other such display) where nearby the user has authorized funds to spend for food. In some embodiments, each location where there is a pending authorization could potentially be highlighted or otherwise designated such that the user can plan where to go based on where there are pending authorizations.

In some embodiments, users might also put authorization limits on themselves. For example, a user going clothes shopping might put a limit on the amount they are authorized to spend at the mall, to ensure they do not spend more than a predetermined amount. Similarly, a user might authorize an amount to spend while in a town on vacation or going out with friends, such that the user does not get carried away and overspend. Various other limits can be applied advantageously as should be apparent in light of the present disclosure.

A user might place restrictions on funds for various other reasons as well. For example, a user might be trying to quit smoking, and thus might restrict funds from being used for smoking-related items or even at locations where smoking is allowed. Similarly, a user who is a recovering alcoholic or otherwise is trying to avoid alcohol might restrict his or her own funds from being spent on alcohol or even being spent at locations where alcohol is available. Users with gambling problems might prevent funds from being accessible at casinos, users trying to lose weight can limit funds to certain types or amounts of food, etc. Various other self-limitations can be applied as well as should be apparent in light of the present disclosure.

Figure 9:
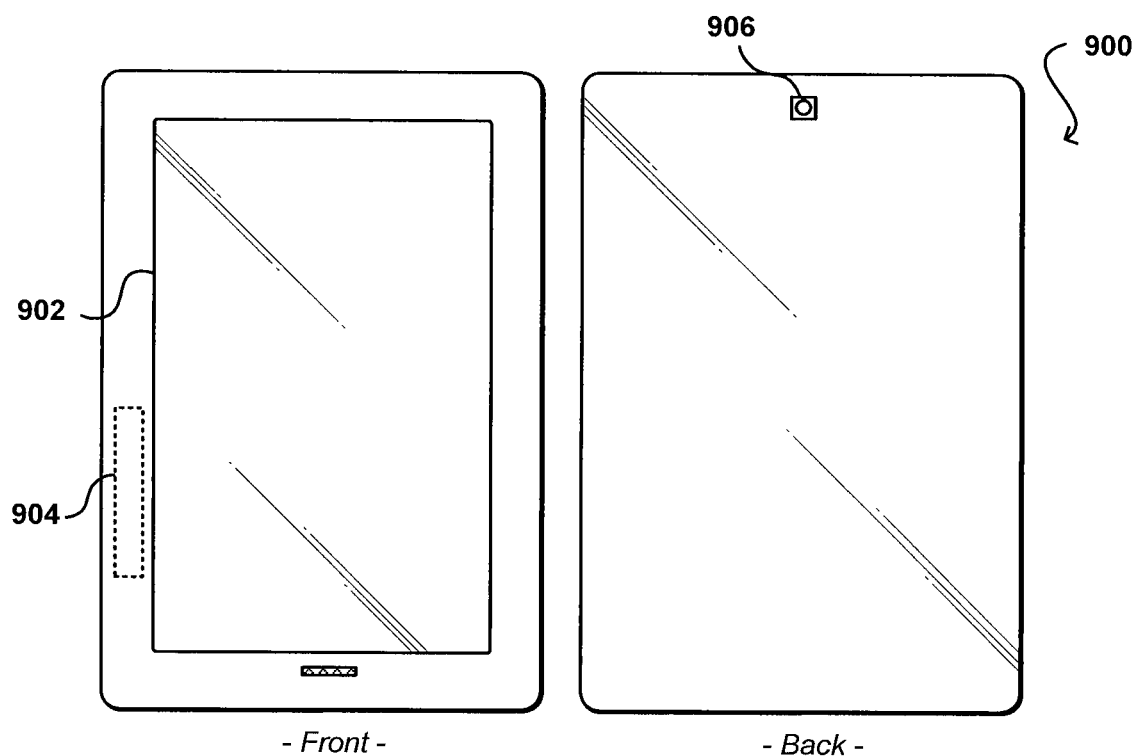
FIG. 9 illustrates an example computing device that can be utilized in accordance with various embodiments.

FIG. 9 illustrates an example of a computing device 900 that can be used in accordance with various embodiments. Although a portable computing device (e.g., a smart phone, an electronic book reader, or tablet computer) is shown, it should be understood that any device capable of receiving, transmitting, and/or processing information can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 900 has a display screen 902, which under normal operation will display information to a user facing the display screen (e.g., on the same side of the computing device as the display screen). The computing device in this example can include one or more image capture elements, in this example including one image capture element 906 on a back side of the device, although it should be understood that image capture elements could also, or alternatively, be placed on the sides or corners of the device, and that there can be any appropriate number of capture elements of similar or different types. Each image capture element 906 may be, for example, a camera, a charge-coupled device (CCD), a motion detection sensor, or an infrared sensor, or can utilize any other appropriate image capturing technology. An image capture element can be used to capture image information of a user of the device, which can be used for purposes such as facial recognition and identity verification. The computing device can also include at least one microphone or other audio capture element(s) capable of capturing audio data, as may be useful for voice recognition and user identification in accordance with other embodiments. Various other types of input can be utilized as well as known in the art for use with such devices. The example computing device 900 also includes at least one secure verification component 904, such as an NFC chip having a secure authorization module or portion contained therein. As known in the art, an NFC chip can effectively enable the user of the device to utilize the device as a digital wallet for establishments that support NFC technology.

Figure 10:
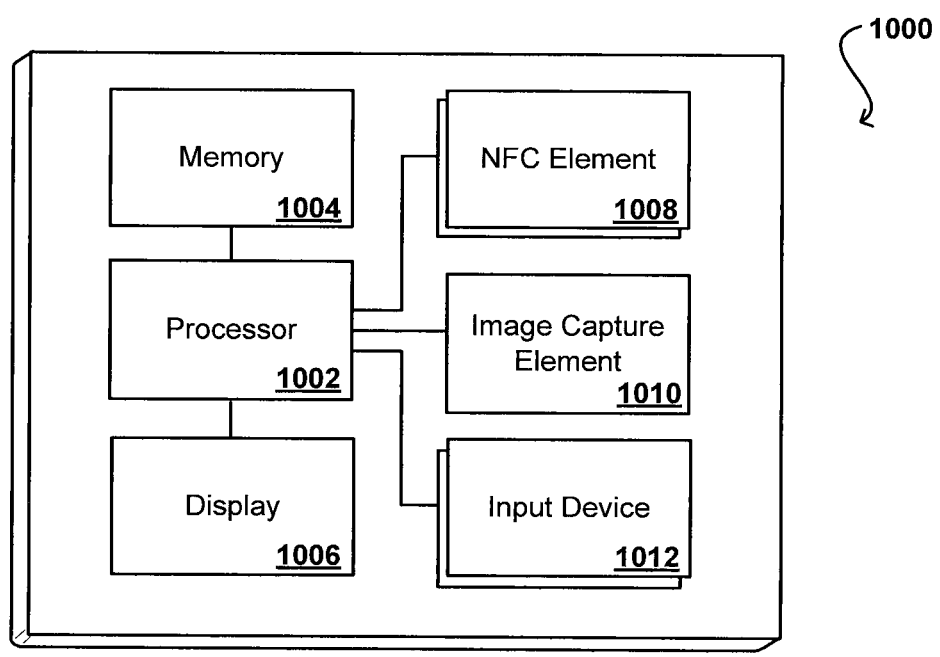
FIG. 10 illustrates an example configuration of components of an example computing device such as that illustrated in FIG. 9.

FIG. 10 illustrates a set of basic components of a computing device 1000 such as the device 900 described with respect to FIG. 9. In this example, the device includes at least one processor 1002 for executing instructions that can be stored in a memory device or element 1004, As would be apparent to one of ordinary skill in the art, the device can include many types of memory, data storage or non-transitory computer-readable media, such as a first data storage for program instructions for execution by the processor 1002, the same or separate storage can be used for images or data, a removable memory can be available for sharing information with other devices, and any number of communication approaches can be available for sharing with other devices. The device typically will include some type of display element 1006, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1010, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more secure authentication components 1008 enabling the device to provide identifying information to be used in authorizing payment for a transaction. As discussed, the authentication components can include NFC or other such components for providing secure identification information. The device can also include at least one additional input device 1012 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 11:
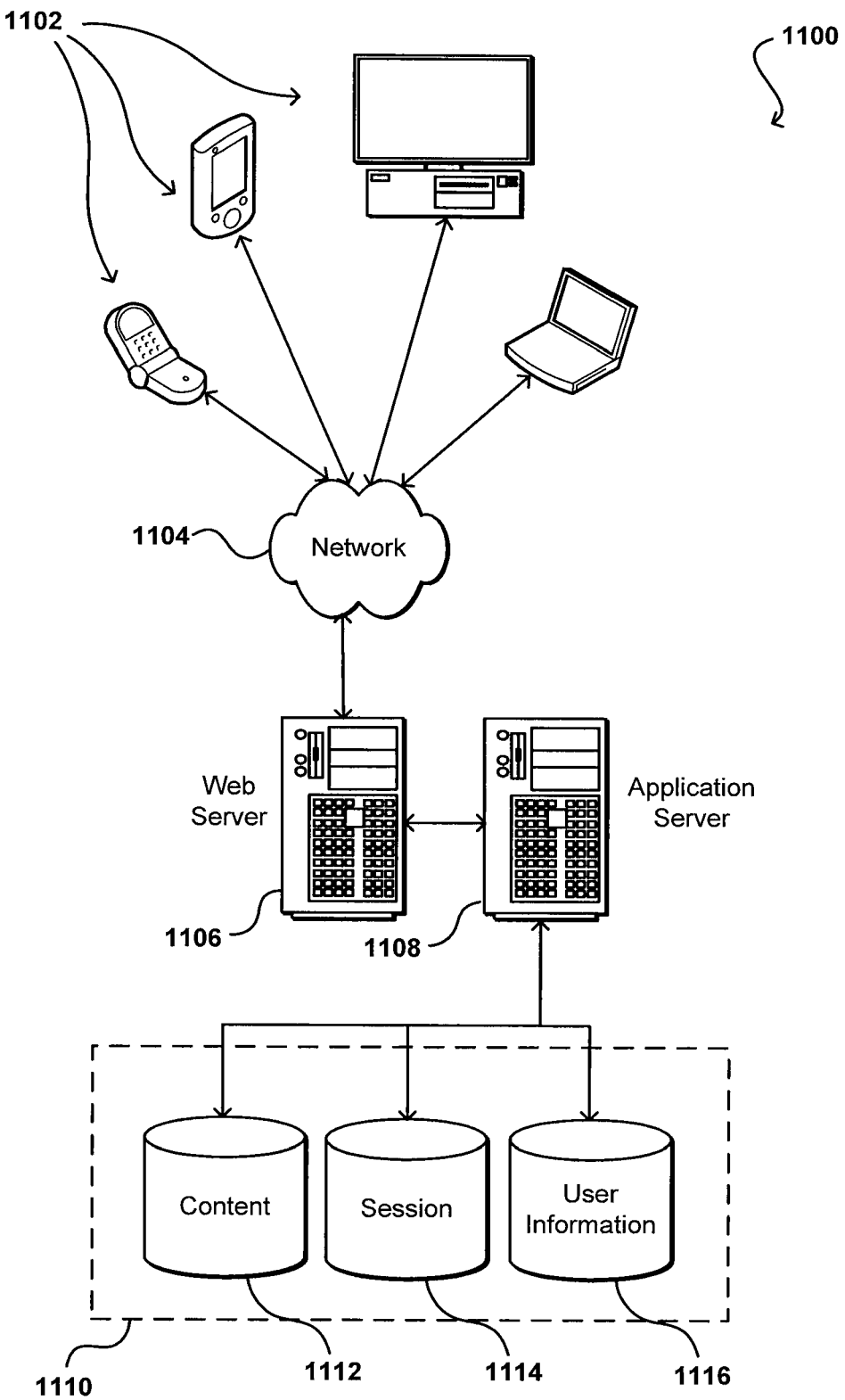
FIG. 11 illustrates an example environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of enabling payment from a source of funds to be authorized for a transaction at a specified location, comprising:

receiving location data at a first computing device;

generating a map on a display of the first computing device based at least in part on the received location data, the map including a plurality of selectable locations each corresponding to a physical location at which an amount of funds may be designated for use;

receiving a first selection of a first selectable location of the plurality of selectable locations;

presenting map information on the map to be displayed to a first user of the first computing device, the map information being presented in response to the first selection of the first selectable location of the plurality of selectable locations, and the map information being associated with the first selectable location;

displaying map information about one or more entities located within a first determined physical distance from the first selectable location based at least in part on the first selection of the first selectable location;

receiving from the first user a second selection of at least one of the one or more entities within the first determined physical distance, an identity of a second user, and an amount of funds to be available to the second user to execute transactions with respect to the at least one of the one or more entities;

storing the identity of the second user, the amount of funds to be available to the second user, and the selected at least one of the one or more entities collectively as payment authorization data, the identity of the second user, the amount of funds to be available to the second user, and the selected at least one of the one or more entities each being displayed on the map in response to the second selection;

automatically designating the amount of funds as available to the second user to execute transactions with respect to the selected at least one of the one or more entities, wherein the amount of funds is displayed on a second computing device of the second user once designated as available to the second user;

receiving a request from a payment system of the at least one of the one or more entities to authorize use of the available amount of funds as payment for a particular transaction being executed by the second user, the request including the identity of the second user and geographic information of the at least one of the one or more entities;

determining that the identity of the second user in the request matches the identity of the second user in the stored payment authorization data and that the geographic information in the request corresponds to a location within the first determined distance from the first selectable location corresponding to the map information displayed to the first user of the first computing device; and causing the amount of funds to be transmitted to the payment system of the selected at least one of the one or more entities to complete the particular transaction based at least in part on the determination that the identity in the request matches the identity of the second user in the stored payment authorization data and that the geographic information in the request corresponds to a location within the first determined distance from the first selectable location.

2. The method of claim 1, further comprising:

generating a temporary account associated with the amount of funds;

causing the amount of funds to be transferred from an account associated with the first user to the temporary account; and providing account information for the temporary account to the second computing device.

3. The method of claim 1, further comprising:

obtaining account information for an account associated with the first user; and enabling the payment for at least part of the transaction to be pulled from the account associated with the first user based at least in part upon the account information.

4. The method of claim 1, further comprising:

flagging the amount of funds with any limitations specified by the first user.

5. A method of authorizing a future payment towards at least one transaction of a recipient, comprising:

receiving location data at a first computing device;

generating a map-based interface on a display of the first computing device based at least in part on the received location data, the map-based interface including a plurality of selectable locations each corresponding to a physical location at which an amount of funds may be designated for use;

receiving a first selection of at least one selectable location of the plurality of selectable locations;

providing first information for display on the map-based interface information about one or more entities located within the first determined physical distance from the at least one selectable location based at least in part on the first selection of the first selectable location;

receiving a second selection of at least one of the one or more entities within the first determined physical distance, identifying information for an intended recipient, and an amount of funds to be available to the intended recipient to execute transactions with respect to the at least one of the one or more entities within the first determined physical distance;

storing payment authorization information including the amount of funds, the selected at least one of the one or more entities, and the identifying information for the intended recipient, the amount of funds, the selected at least one of the one or more entities, and the identifying information for the intended recipient each being displayed on the map-based interface in response to the second selection; and automatically designating the amount of funds as available to the intended recipient to execute transactions with respect to the selected at least one of the one or more entities, at least a portion of the designated amount of funds to be released upon (i) receiving a request for authorization of payment from a payment system of the selected at least one of the one or more entities, the request identifying the intended recipient, the the selected at least one of the one or more entities, and geographic information of the selected at least one of the one or more entities, and (ii) determining that the intended recipient identified in the request matches the identifying information for the intended recipient stored in the payment authorization data and that the geographic information in the request corresponds to a location within the first determined physical distance from the first selectable location, wherein the amount of funds is displayed on a second computing device of the intended recipient once designated as available to the intended recipient.

6. The method of claim 5, further comprising:

enabling a user to select at least one limitation on at least one type of item to which the amount of funds is able to be applied.

7. The method of claim 5, further comprising:

enabling a user to specify at least one of a frequency or number of occurrences of an availability of the amount of funds.

8. The method of claim 5, further comprising:

enabling a user to specify a source of funds to be used to supply the amount of funds.

9. The method of claim 8, wherein the payment authorization information is stored by an entity other than an entity associated with the source of funds.

10. The method of claim 5, further comprising:

enabling a user to request for a notification upon the amount of funds being applied to a transaction by the intended recipient.

11. The method of claim 5, wherein the user is able to select at least one of multiple locations of at least one type of establishment or multiple types of establishment within a geographical region.

12. The method of claim 5, wherein the information for display about the one or more entities located within the first determined distance from the at least one location includes graphical representations of the one or more entities.

13. The method of claim 5, wherein the user is further able to select one or more locations where the intended recipient is not able to utilize the amount of funds.

14. A method of applying funds to a transaction, comprising:

receiving at a first computing device identifying information for a first user and a current geographic location of the first user from a payment system of an entity;

obtaining designated funds authorized to be applied to one or more transactions for the first user at one or more geographic locations within a determined physical distance from the current geographic location of the first user based at least in part upon the identifying information and the current geographic location of the first user, the designated funds being automatically designated as available to the first user to execute transactions with respect to the entity, the designated funds being designated by a second computing device of a second user via a map-based interface generated on the second computing device based at least in part on location data at the second computing device, on condition that at least a portion of the designated funds is to be released upon determining that the received identifying information of the first user matches identifying information for the first user previously stored on the second computing device and geographic information of the entity corresponds to one of the one or more geographical locations within the determined physical distance from the current geographic location of the first user, wherein the designated funds are displayed on the first computing device of the first user once designated as available to the first user;

providing for display on the map-based interface the one or more geographic locations where the designated funds are authorized to be applied for the first user; and enabling at least one portion of the designated funds to be applied to one or more transactions at the one or more geographic locations where the designated funds are authorized to be applied for the first user.

15. The method of claim 14, wherein enabling at least a portion of the designated funds to be applied to one or more transactions includes sending a request to a separate entity, the request including at least the current geographic location of the user and the identifying information.

16. The method of claim 14, wherein receiving identifying information for the user includes receiving at least one identifier from the first computing device.

17. The method of claim 16, wherein the at least one identifier is transmitted using at least one near field communications (NFC) component.

18. The method of claim 16, wherein multiple sources of funds are capable of being applied to the one or more transactions when each of those sources is authorized for the user at the one or more geographic locations.

19. A non-transitory computer-readable storage medium storing instructions for authorizing a payment, the instructions when executed by a processor causing the processor to:

receive location data at a first computing device;

generate a map-based interface on a display of the first computing device based at least in part on the received location data, the map-based interface including a plurality of selectable locations each corresponding to a physical location at which an amount of funds may be designated for use;

receive a first selection of at least one selectable location of the plurality of selectable locations;

provide first information for display on the map-based interface information about one or more entities located within the first determined physical distance from the at least one selectable location based at least in part on the first selection of the first selectable location;

receive a second selection of at least one of the one or more entities within the first determined physical distance, identifying information for an intended recipient, and an amount of funds to be available to the intended recipient to execute transactions with respect to the at least one of the one or more entities within the first determined physical distance;

store payment authorization information including the amount of funds, the selected at least one of the one or more entities, and the identifying information for the intended recipient, the amount of funds, the selected at least one of the one or more entities, and the identifying information for the intended recipient each being displayed on the map-based interface in response to the second selection; and automatically designate the amount of funds as available to the intended recipient to execute transactions with respect to the selected at least one of the one or more entities, at least a portion of the designated amount of funds to be released upon (i) receiving a request for authorization of payment from a payment system of the selected at least one of the one or more entities, the request identifying the intended recipient, the the selected at least one of the one or more entities, and geographic information of the selected at least one of the one or more entities, and (ii) determining that the intended recipient identified in the request matches the identifying information for the intended recipient stored in the payment authorization data and that the geographic information in the request corresponds to a location within the first determined physical distance from the first selectable location, wherein the amount of funds is displayed on a second computing device of the intended recipient once designated as available to the intended recipient.

20. The non-transitory computer-readable storage medium of claim 19, wherein the instructions when executed further cause the processor to:

enable the user to select at least one limitation on at least one type of item to which the amount of funds is able to be applied; and enable the user to specify at least one of a frequency or number of occurrences of an availability of the amount of funds.

21. The non-transitory computer-readable storage medium of claim 19, wherein the instructions when executed further cause the processor to:

enable the user to specify a source of funds to be used to supply the amount of funds.

22. A non-transitory computer-readable storage medium storing instructions for applying funds to a transaction, the instructions when executed by a processor causing the processor to:

receive at a first computing device identifying information for a first user and a current geographic location of the first user from a payment system of an entity;

obtaining designated funds authorized to be applied to one or more transactions for the first user at one or more geographic locations within a determined physical distance from the current geographic location of the first user based at least in part upon the identifying information and the current geographic location of the first user, the designated funds being automatically designated as available to the first user to execute transactions with respect to the entity, the designated funds being designated by a second computing device of a second user via a map-based interface generated on the second computing device based at least in part on location data at the second computing device, on the condition that at least a portion of the designated funds is to be released upon determining that the received identifying information of the first user matches identifying information for the first user previously stored on the second computing device and geographic information of the entity corresponds to one of the one or more geographical locations within the determined physical distance from the current geographic location of the first user, wherein the designated funds are displayed on the first computing device of the first user once designated as available to the first user;

provide for display on the map-based interface the one or more geographic locations where the designated funds are authorized to be applied for the first user; and enable at least one portion of the designated funds to be applied to one or more transactions at the one or more geographic locations where the designated funds are authorized to be applied for the first user.

23. The non-transitory computer-readable storage medium of claim 22, wherein the instructions when executed further cause the processor to enable the first user to send a message to the second user when the at least one portion of the designated funds are applied to the one or more transactions.

\* \* \* \* \*